United States Patent
Ahlqvist et al.

(10) Patent No.: US 7,918,503 B2
(45) Date of Patent: Apr. 5, 2011

(54) ADJUSTABLE SEAT

(75) Inventors: Anders Ahlqvist, Vårgårda (SE); Lars Carlstedt, Vårgårda (SE); Lennart Haglund, Vårgårda (SE); Per-Olof Svensson, Vårgårda (SE); Björn Jansson, Kode (SE); Carin Stenmark, Västra Frölunda (SE); Ulrika Landelius, Säro (SE)

(73) Assignee: Autoliv Development AB, Vargarda (SE)

( * ) Notice: Subject to any disclaimer, the term of this patent is extended or adjusted under 35 U.S.C. 154(b) by 432 days.

(21) Appl. No.: 11/795,000

(22) PCT Filed: Jan. 9, 2006

(86) PCT No.: PCT/SE2006/000019
§ 371 (c)(1),
(2), (4) Date: Nov. 7, 2007

(87) PCT Pub. No.: WO2006/075945
PCT Pub. Date: Jul. 20, 2006

(65) Prior Publication Data
US 2008/0088164 A1 Apr. 17, 2008

(30) Foreign Application Priority Data

Jan. 12, 2005 (GB) .................................. 0500571.5

(51) Int. Cl.
*B60N 2/26* (2006.01)
(52) U.S. Cl. ...................... 297/234; 297/237; 297/344.15
(58) Field of Classification Search .................. 297/233, 297/234, 237, 338, 339, 344.14, 344.15
See application file for complete search history.

(56) References Cited

U.S. PATENT DOCUMENTS

| | | | |
|---|---|---|---|
| 2,584,481 | A | 2/1952 | Mast et al. |
| 3,866,975 | A | 2/1975 | Fricko |
| 4,596,420 | A | 6/1986 | Vaidya |
| 5,106,158 | A | 4/1992 | Dukatz et al. |
| 5,161,855 | A | 11/1992 | Harmon |
| 5,265,934 | A | 11/1993 | Forget |
| 5,282,668 | A | 2/1994 | Heussner et al. |
| 5,385,384 | A | 1/1995 | Gierman et al. |
| 5,540,479 | A | 7/1996 | Thomas et al. |
| 5,636,884 | A * | 6/1997 | Ladetto et al. ............. 296/65.09 |
| 5,660,437 | A * | 8/1997 | Bauer et al. ................... 297/237 |

(Continued)

FOREIGN PATENT DOCUMENTS

DE 4315479 C 5/1994

(Continued)

OTHER PUBLICATIONS

Partial Search Report under Section 17 for Aplication No. GB0510368.4, UK Patent Office, Jul. 27, 2005.

*Primary Examiner* — Peter R. Brown
(74) *Attorney, Agent, or Firm* — Harness, Dickey & Pierce, P.L.C.

(57) ABSTRACT

An adjustable seat (1) incorporates a moveable squab element (4). The squab element may be moved from an initial position in which the squab element is flush with the remaining parts of the vehicle seat to a first intermediate position and then to a subsequent second position. The squab is mounted on a first linkage (7) which carries an intermediate support. A second linkage (10) extends from the intermediate support to a seat mount (9) incorporated with the squab element.

24 Claims, 15 Drawing Sheets

U.S. PATENT DOCUMENTS

Figure 1:
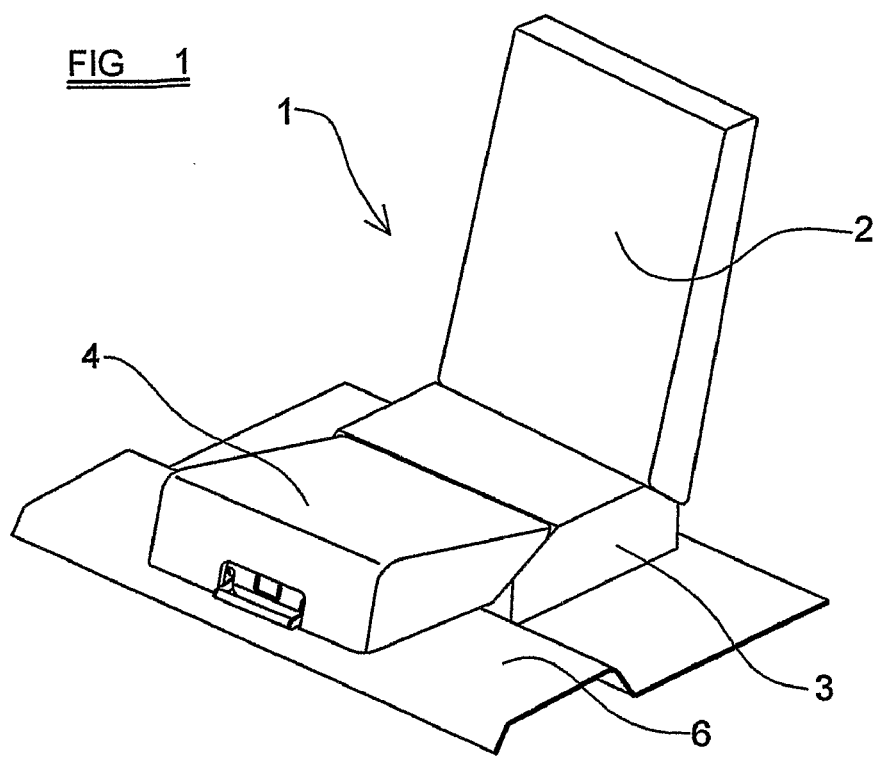

| | | | |
|---|---|---|---|
| 5,700,054 A | 12/1997 | Lang | |
| 5,733,005 A * | 3/1998 | Aufrere et al. | 297/340 |
| 5,788,326 A * | 8/1998 | Kawade et al. | 297/236 |
| 5,997,083 A * | 12/1999 | Ono et al. | 297/237 |
| 6,082,817 A | 7/2000 | Muller | |
| 6,123,380 A * | 9/2000 | Sturt et al. | 296/65.09 |
| 6,971,718 B2 * | 12/2005 | Haglund | 297/236 |
| 7,070,239 B1 | 7/2006 | Ugrekhelidze et al. | |
| 7,413,249 B2 | 8/2008 | Leutert | |
| 7,815,256 B2 | 10/2010 | Erlingstam et al. | |
| 2005/0116516 A1 * | 6/2005 | Robinson | 297/233 |
| 2005/0275258 A1 | 12/2005 | Patterson et al. | |
| 2009/0079242 A1 | 3/2009 | Erlingstam et al. | |

FOREIGN PATENT DOCUMENTS

| | | |
|---|---|---|
| DE | 43 40 337 A | 6/1994 |
| DE | 4404319 C | 4/1995 |
| DE | 4418587 A | 11/1995 |
| DE | 44 42 530 A1 | 6/1996 |
| DE | 196 54 205 A | 6/1998 |
| EP | 0286542 A2 | 10/1988 |
| EP | 0 593 146 A1 | 4/1994 |
| EP | 0633159 A | 1/1995 |
| EP | 0 666 194 | 8/1995 |
| EP | 0 803 398 A2 | 10/1997 |
| EP | 0 827 863 A3 | 3/1998 |
| FR | 2692209 A1 | 12/1993 |
| GB | 2278775 A | 12/1994 |
| GB | 2368272 A | 5/2002 |
| JP | 07-165012 A | 6/1995 |
| JP | 11-180251 A | 7/1999 |
| JP | 2000-280861 A | 10/2000 |

\* cited by examiner

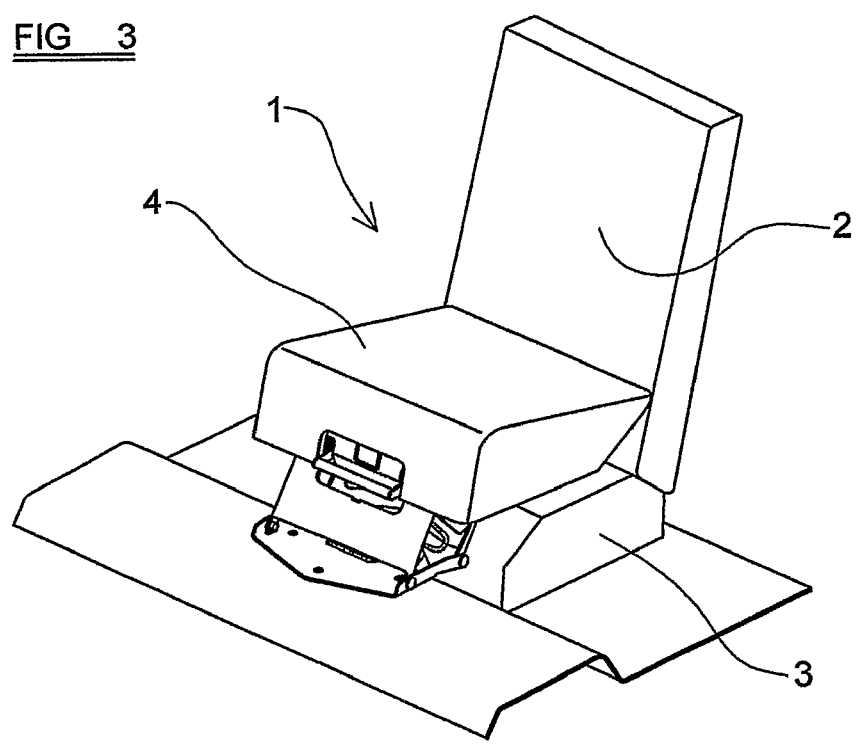
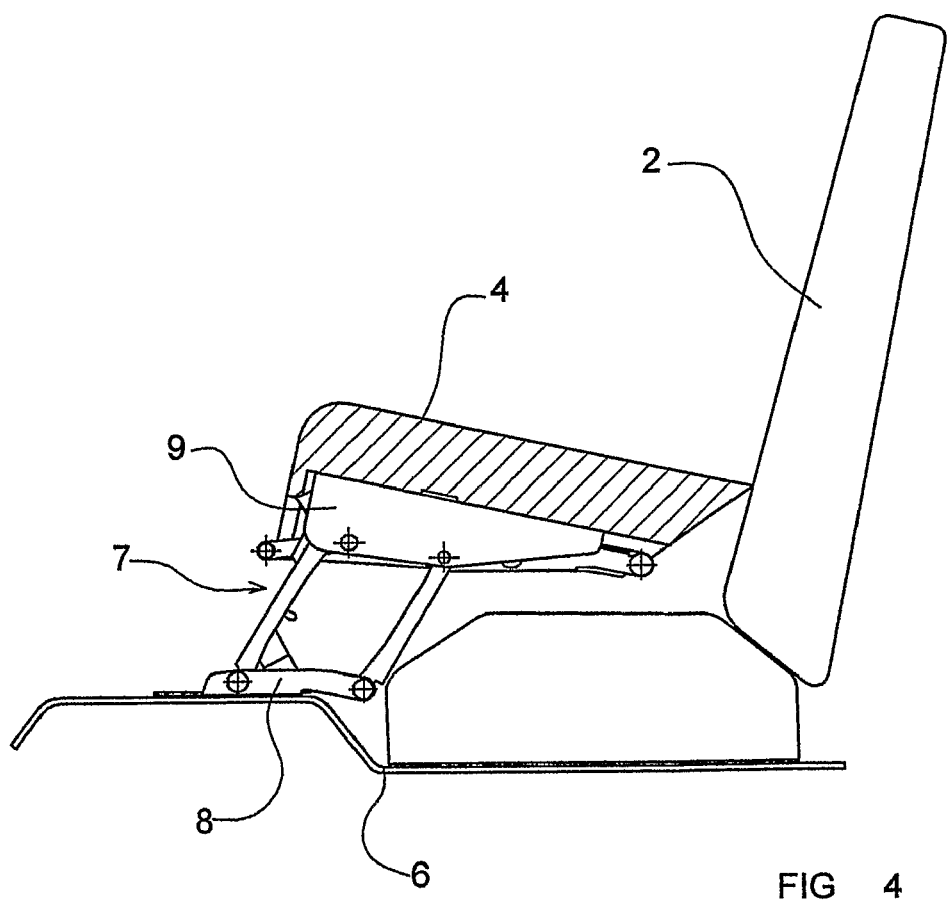

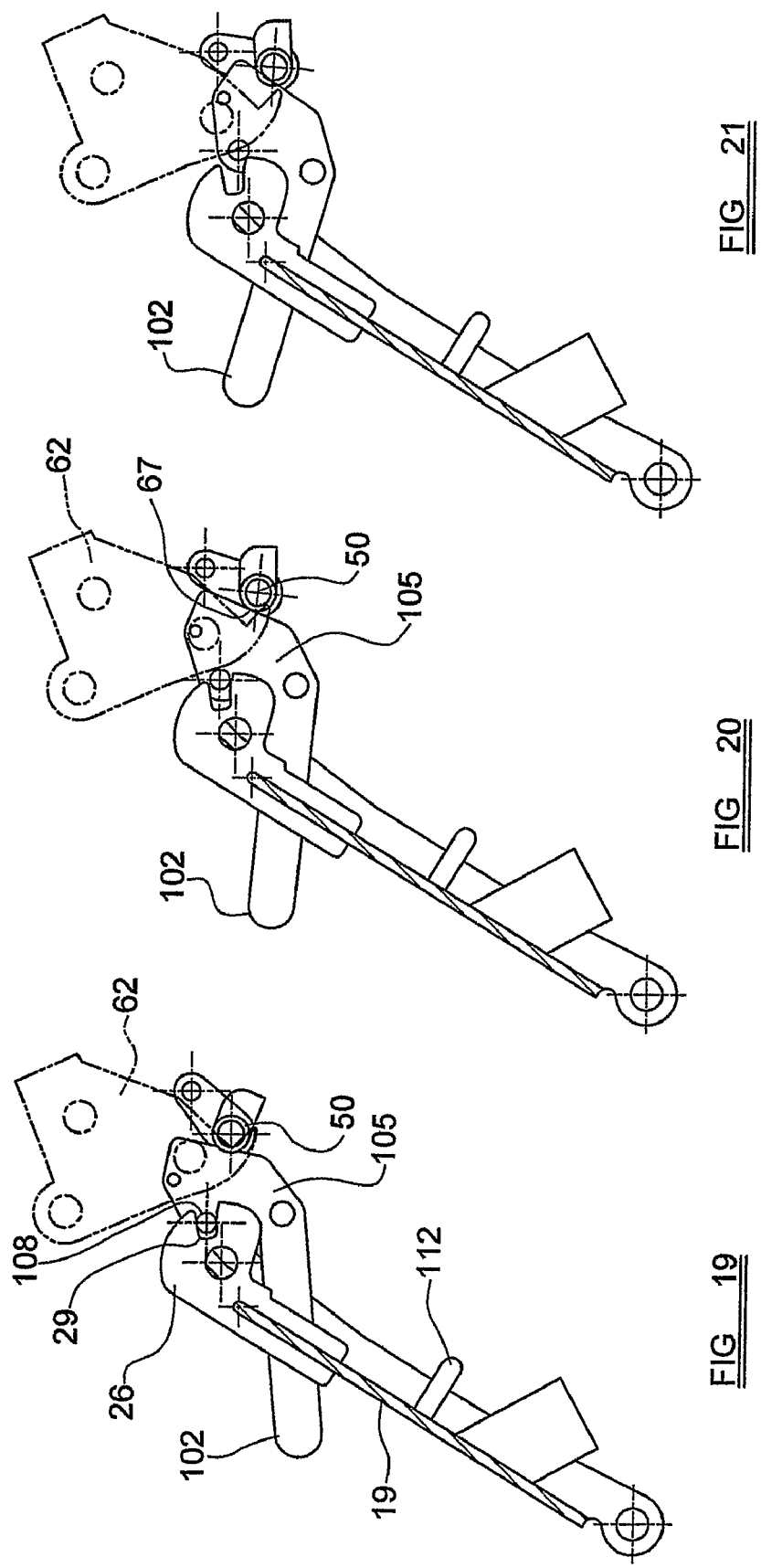

ADJUSTABLE SEAT

CROSS-REFERENCE TO RELATED APPLICATIONS

This application is a National Stage of International Application No. PCT/SE2006/000019, filed Jan. 9, 2006 and published (in English) as WO 2006/075945 A1 on Jul. 20, 2006. This application claims the benefit of GB 0500571.5, filed Jan. 12, 2005. The disclosures of the above applications are incorporated herein by reference.

THE PRESENT INVENTION relates to an adjustable seat, and more particularly relates to an adjustable seat of the type in which the seat incorporates a moveable squab element, the squab element being moveable from a lowered position in which the seat may be used by an adult to an elevated position in which the seat may be used by a child.

It has been proposed previously to provide an adjustable seat of the type described above, with the adjustable seat being integrated within a vehicle seat, such as a rear "bench" style seat for a motor vehicle. With the moveable squab element in the lowered position it is in alignment with one or more fixed squab elements, and the seat may be used by adults. With the squab element in the elevated position the seat may be used by a child. One seat of this type is shown in EP-0-666,194. This prior proposed seat includes elements mounted on a single linkage, the linkage incorporating an arm that can be received in different recesses to enable the seat elements to be retained in different selected positions.

The present invention seeks to provide an improved adjustable seat.

According to this invention there is provided an adjustable seat, the seat incorporating a moveable squab element, the moveable squab element being mounted to an underlying mount by means of a first linkage carrying an intermediate support, and a second linkage between the intermediate support and the moveable squab element, each linkage being moveable from a retracted position to an extended position, each linkage being associated with a locking mechanism to lock the linkage in the extended position.

Preferably each linkage is associated with a locking mechanism to lock the linkage in the retracted position.

Conveniently the first linkage is a parallel arm linkage.

Advantageously the second linkage is a linkage that effects parallel motion.

Preferably each linkage is associated with a biasing element, the biasing element serving to bias the linkage to the extended position.

Conveniently a first actuator is provided for releasing the locking mechanism associated with the first linkage which retains the first linkage in the retracted position.

Advantageously a second actuator is provided for releasing the locking mechanism associated with the second linkage.

Conveniently the second actuator is a press button and a blocking element is provided to block actuation of the push button, the blocking element being mounted to move in response to movement of the first linkage, to be positioned to block movement of the push button when the first linkage is in the retracted position and to permit movement of the push button when the first linkage is in the extended position.

Advantageously the push button is associated with a catch member, the catch member carrying a detent which engages an apertured retaining plate secured to the moveable squab element to retain the moveable squab element in a predetermined position relative to the intermediate support, the push button being actuable to move the catch to release the detent from the apertured retaining plate to permit the moveable squab element to move upwardly.

Preferably the first actuator also serves as an actuator to release the locking mechanism which locks the first and second linkages in the extended position.

Conveniently the first actuator is a handle, and the handle is associated with a first locking mechanism locking the first linkage in the extended position, and a second locking mechanism locking the second linkage in the extended position, the configuration of the handle and the locking mechanisms being such that on partial movement of the handle the second locking mechanism is released, and on a further movement of the handle the first locking mechanism is released.

Advantageously the first locking mechanism incorporates a latch member which is resiliently biased to engage a recess on an element that forms, or is moveable with, one link of the second linkage to retain that element in a predetermined position, and the second locking arrangement is constituted by an engagement rod received within a recess on an engagement head carried fast with a link of the first linkage, the handle carrying the engagement rod and the handle having a surface engaging the latch member so that movement of the handle moves the latch member and the engagement rod out of their respective recesses.

The adjustable seat may be incorporated in a seat in a vehicle.

Figure 2:
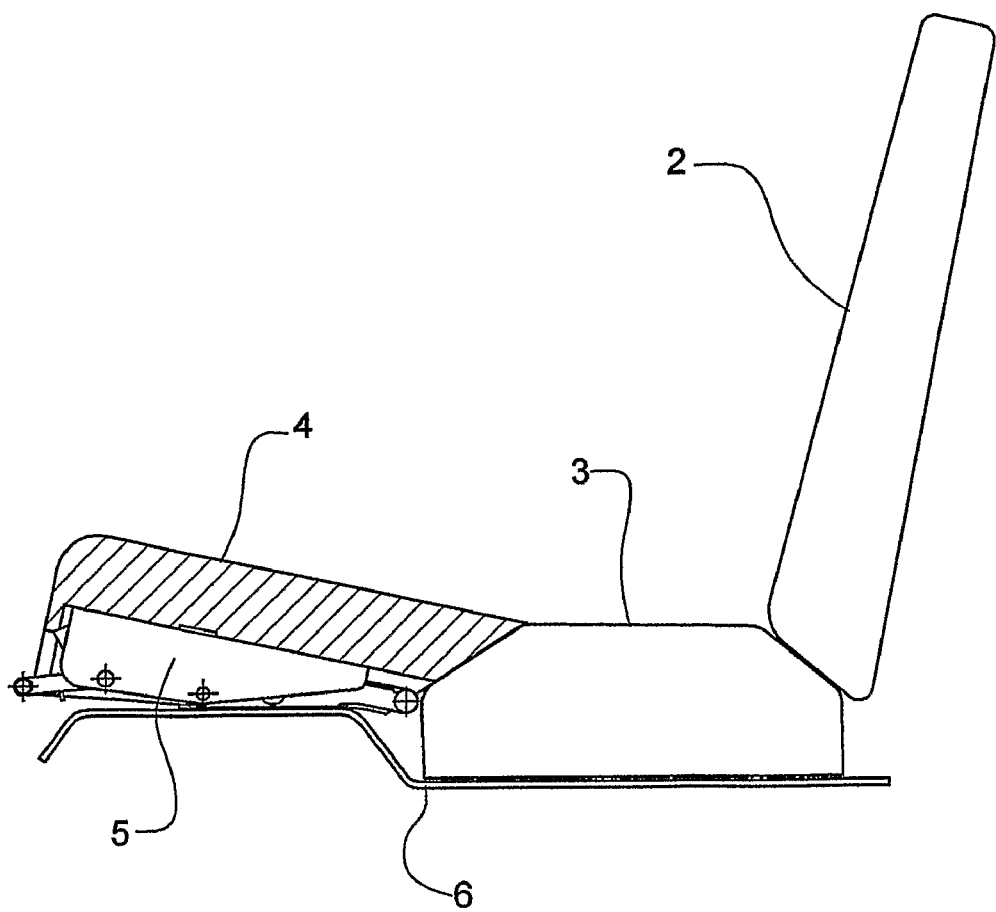
Figure 5:
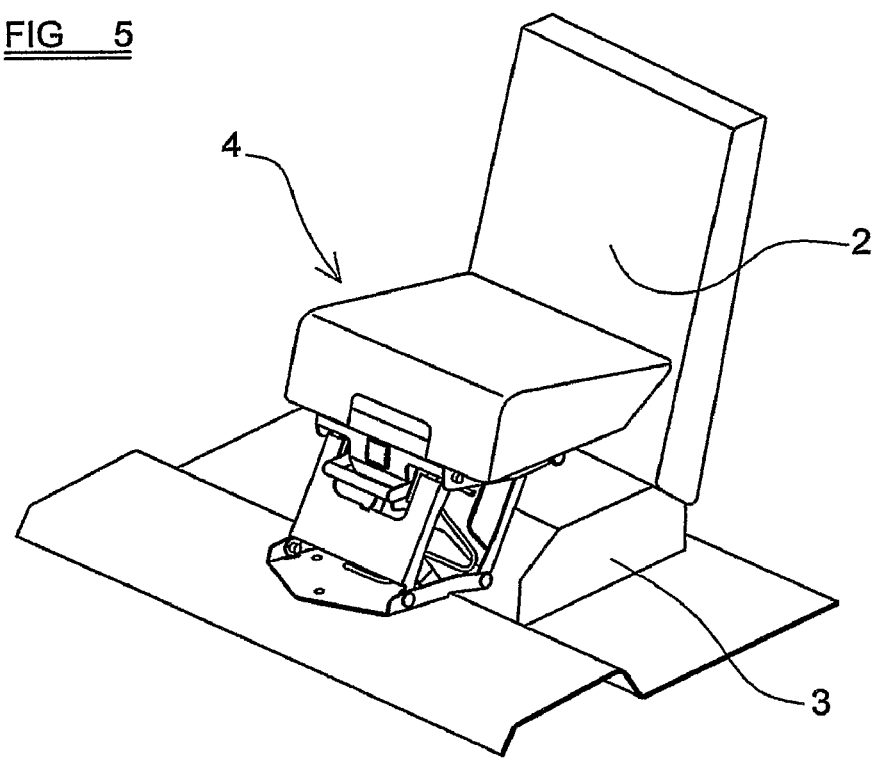
Figure 6:
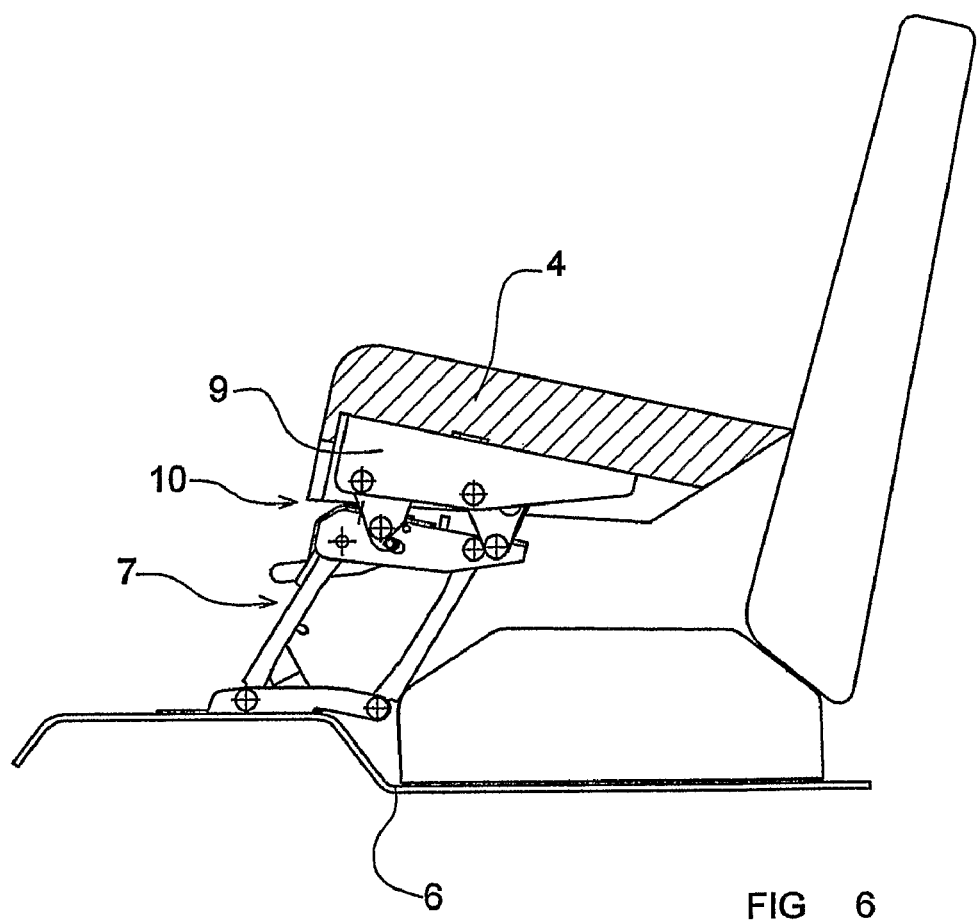
Figure 7:
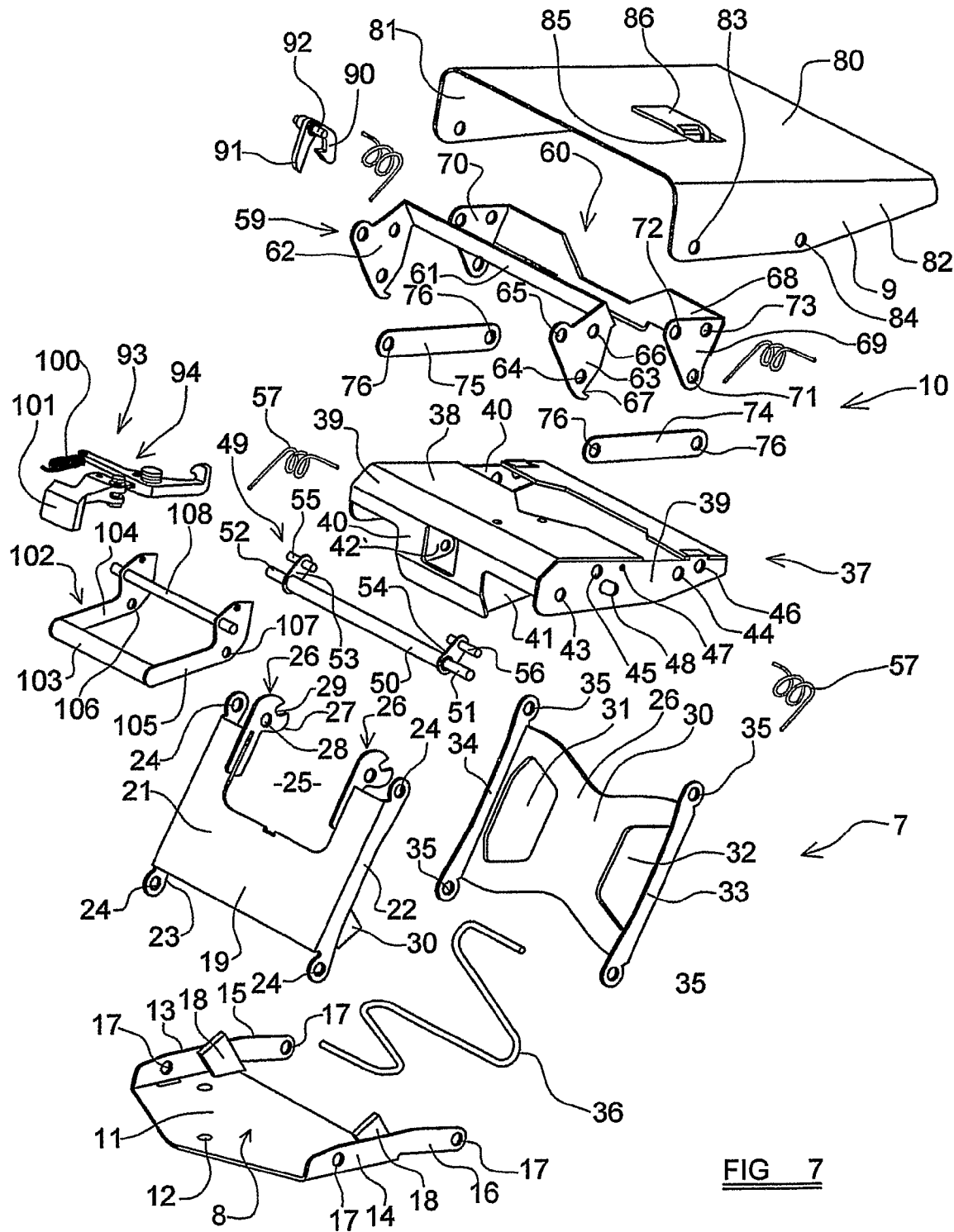
Figure 8:
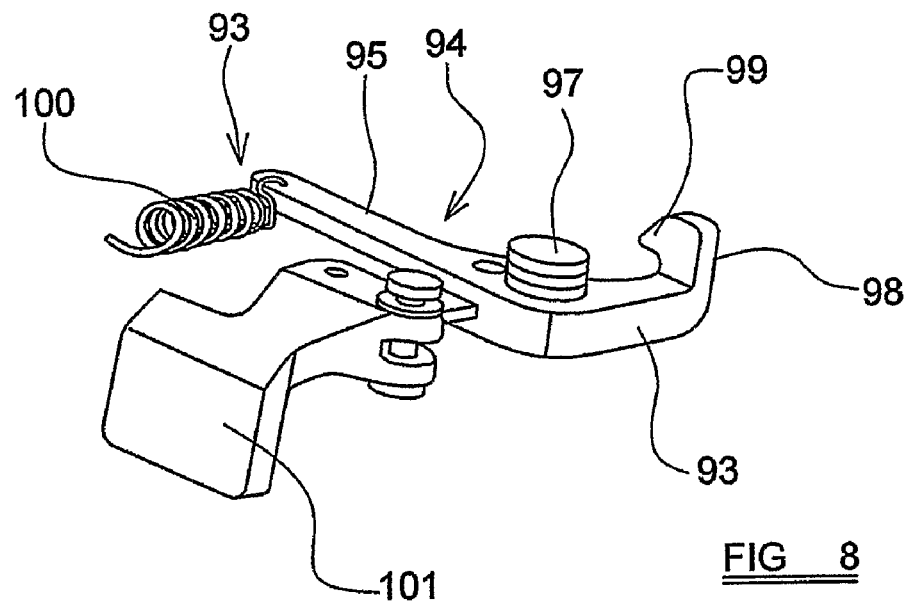
Figure 9:
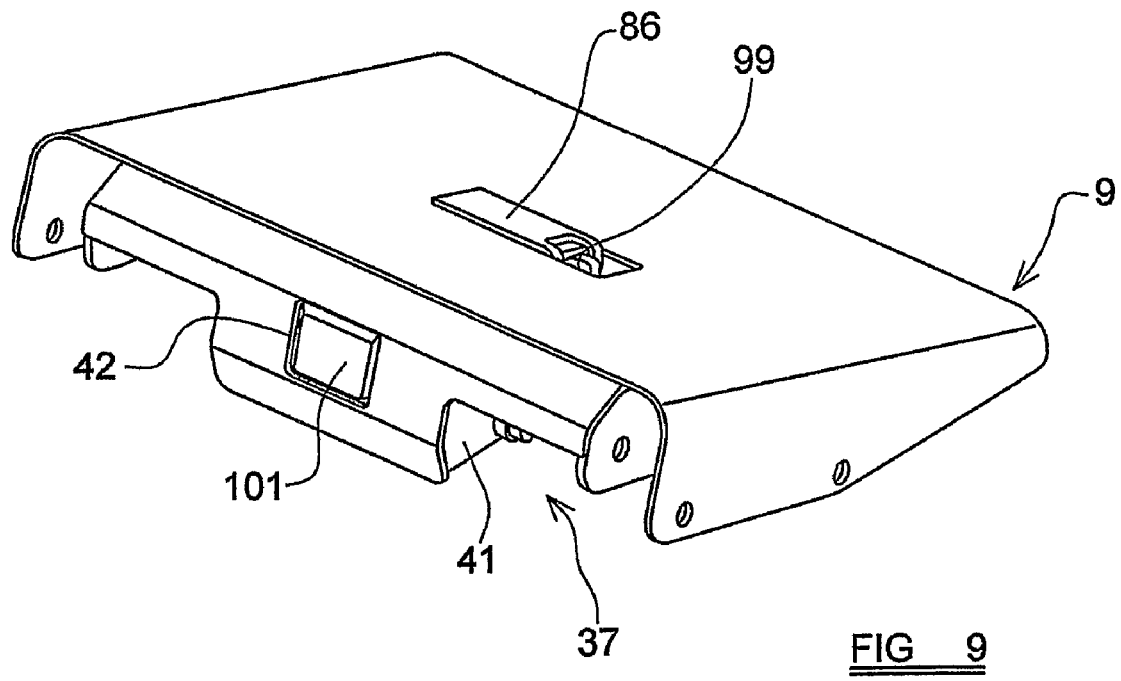
Figure 10:
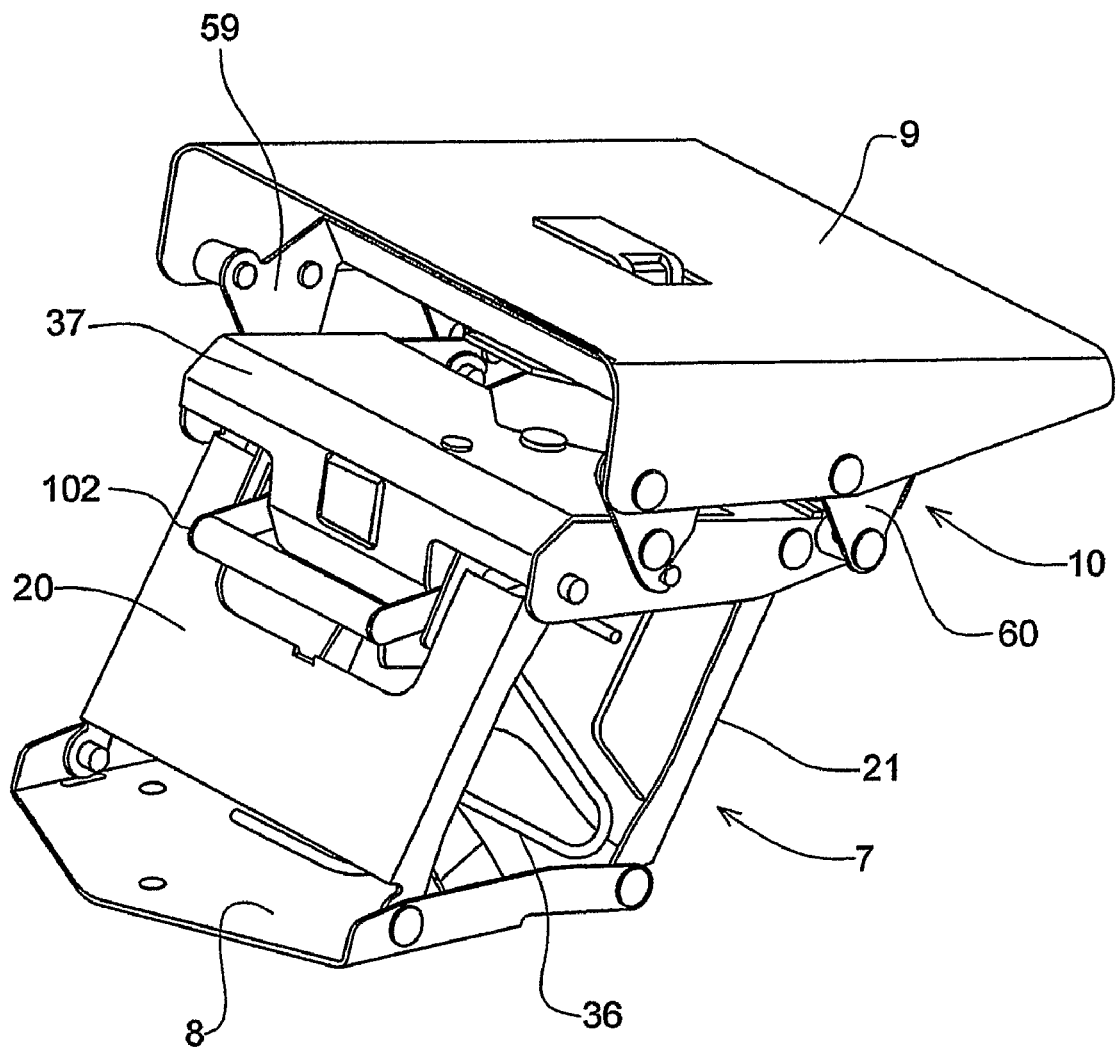
Figure 11:
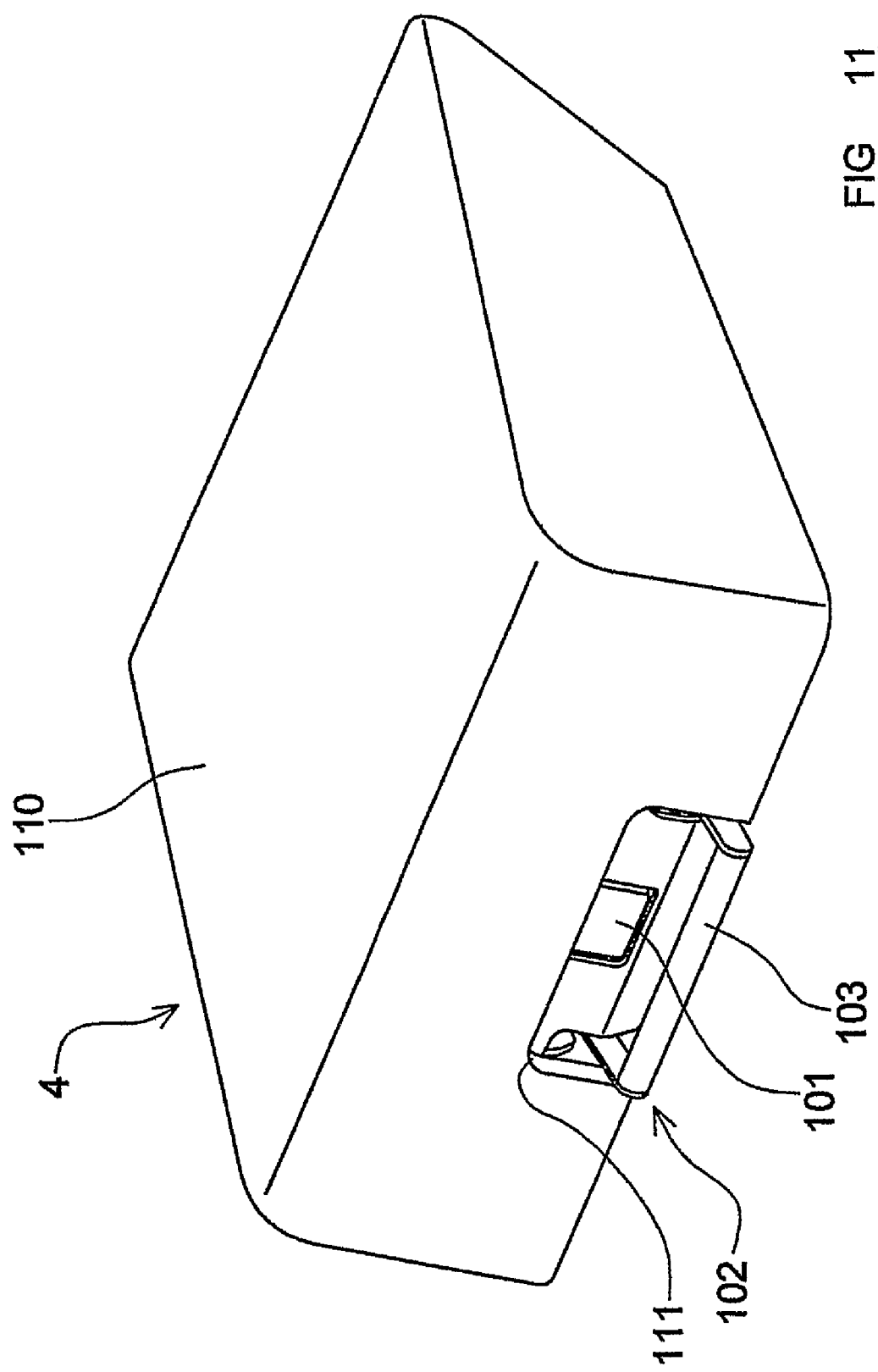
Figure 12:
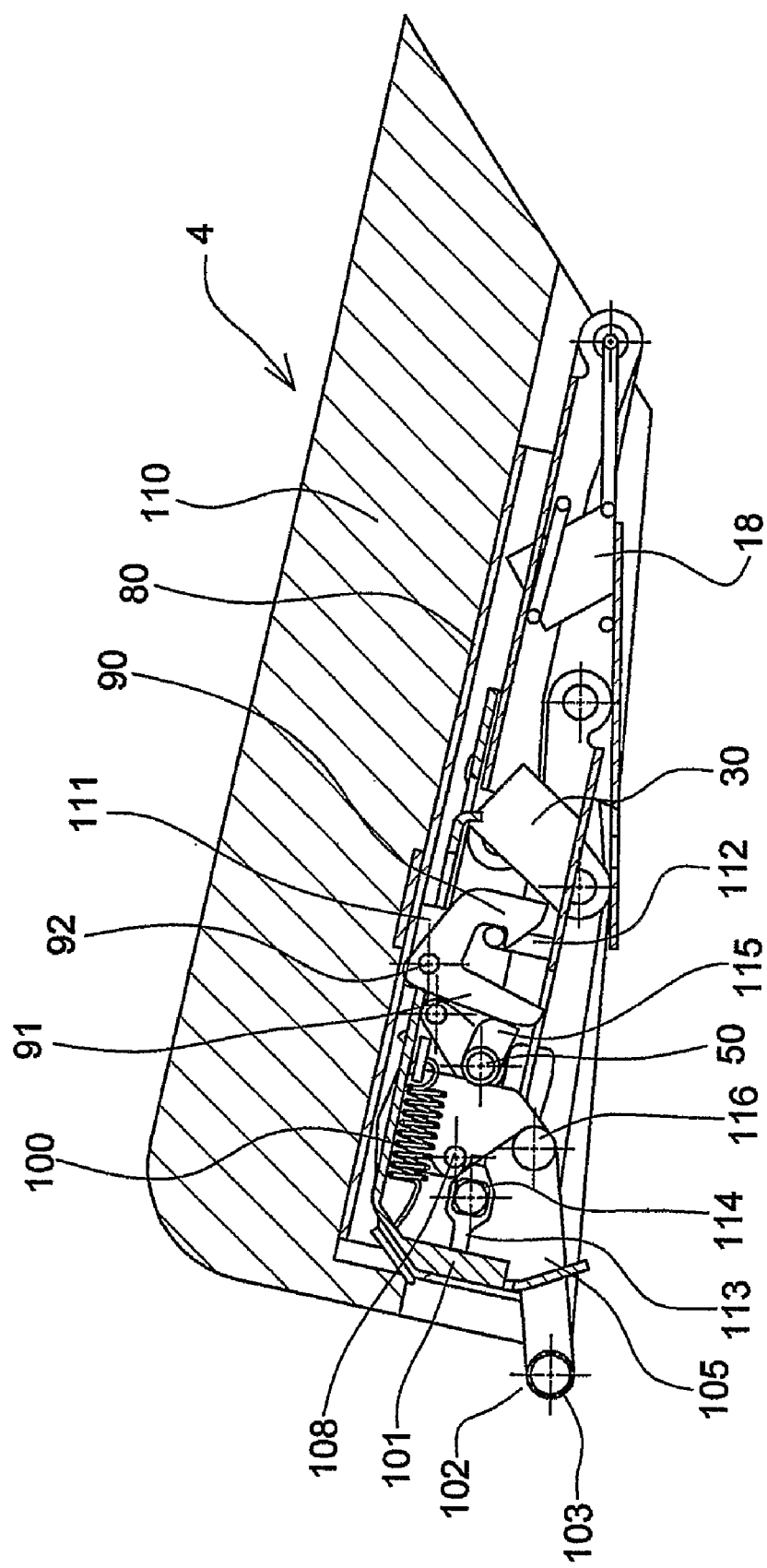
Figure 13:
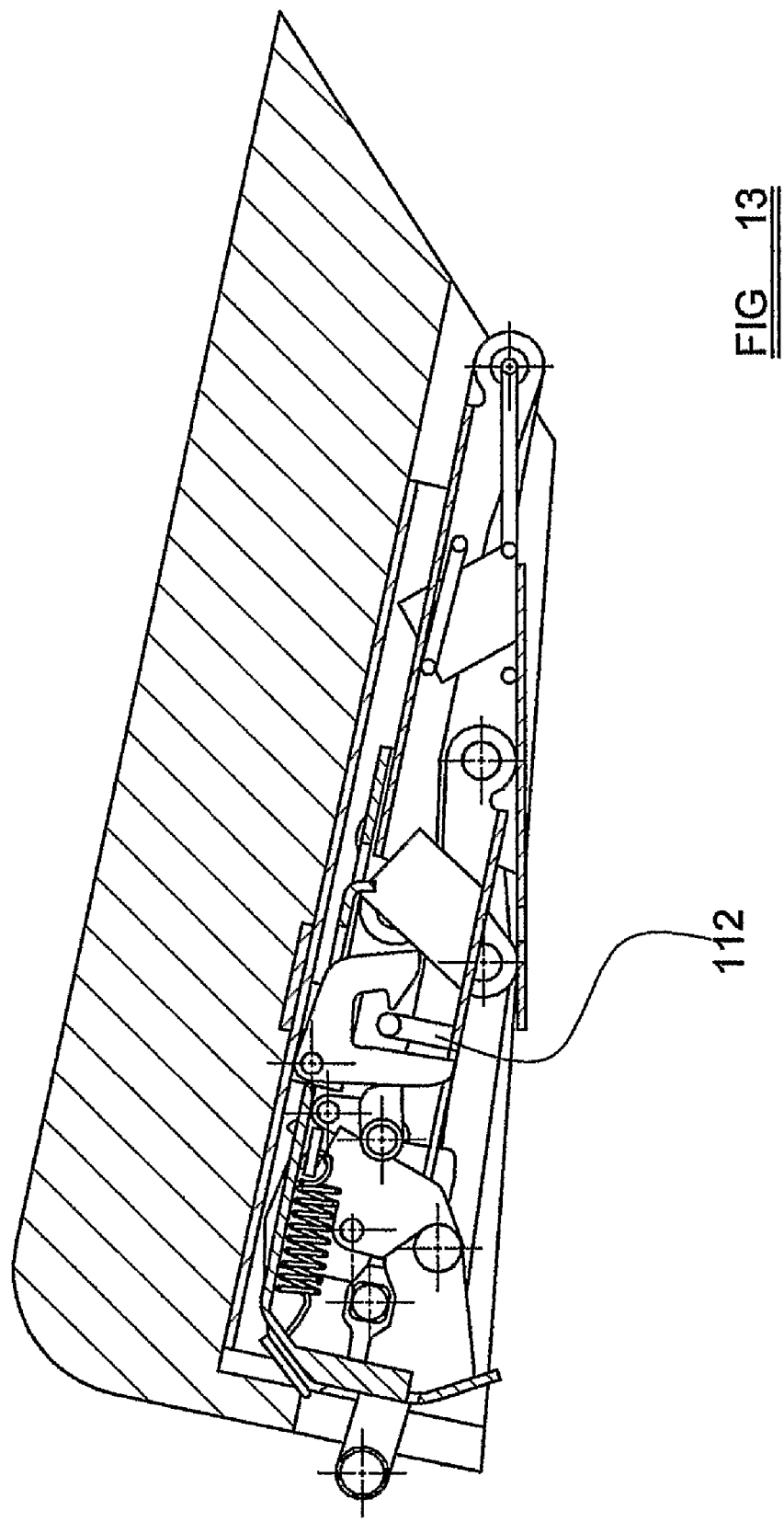
Figure 14:
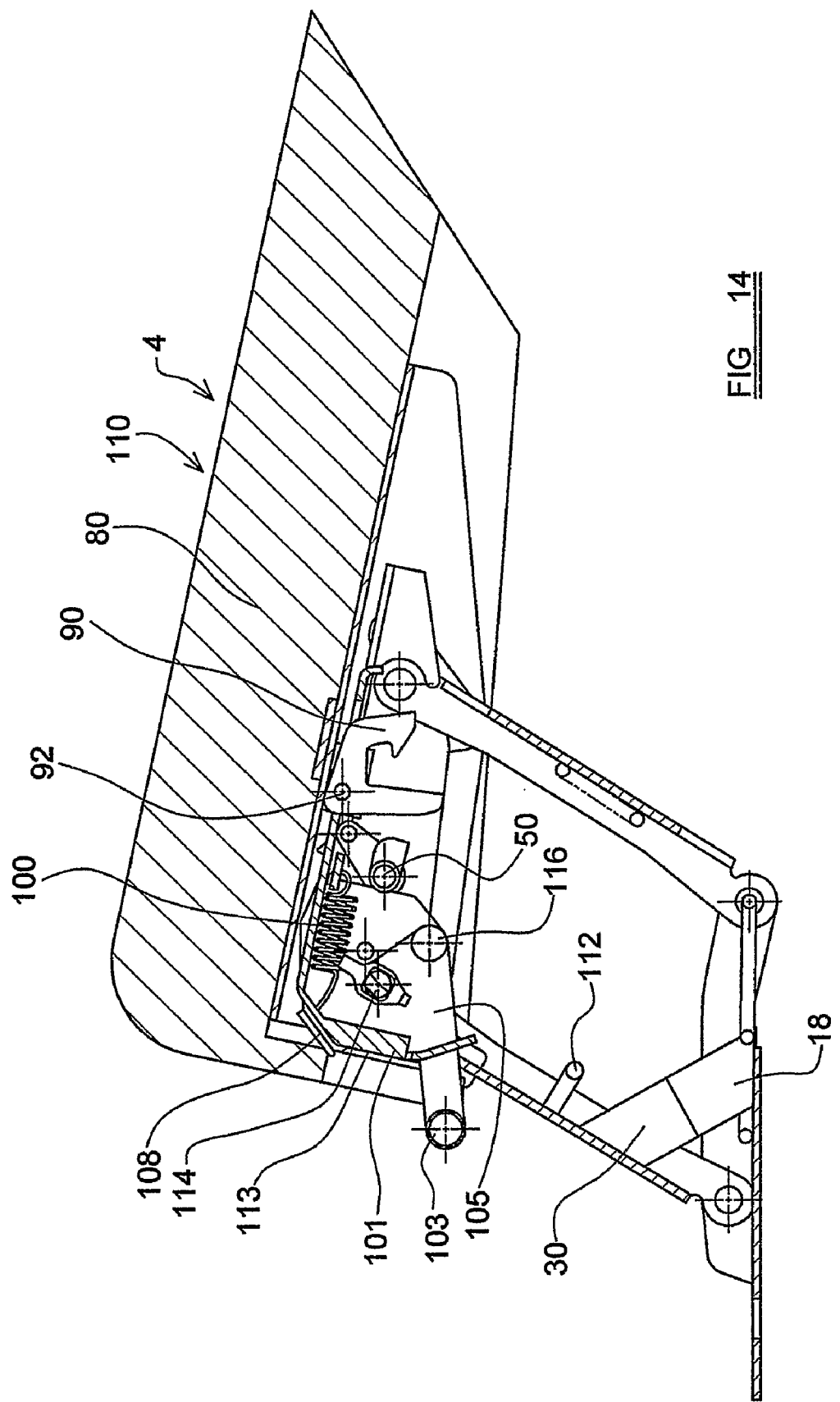
Figure 15:
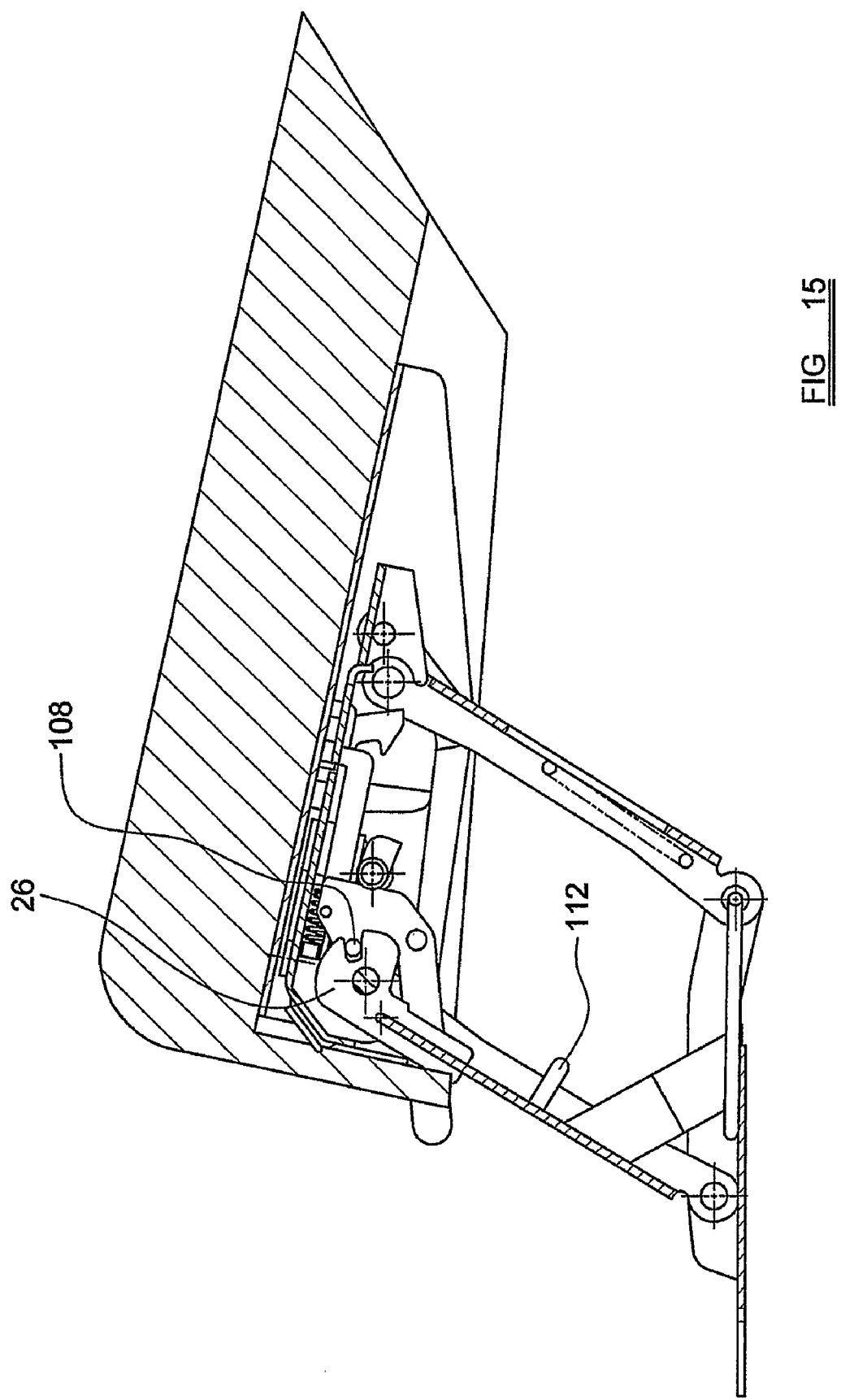
Figure 16:
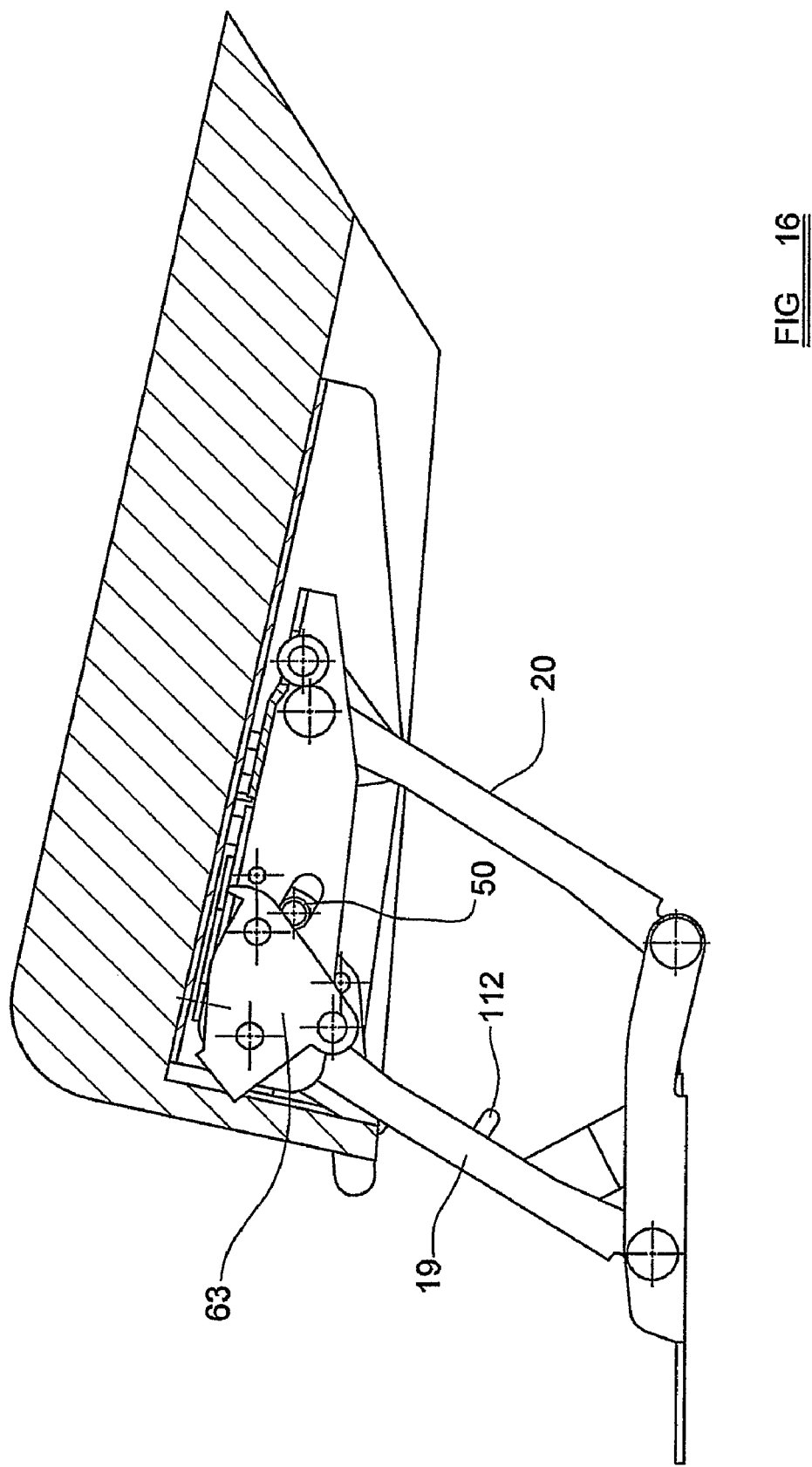
Figure 17:
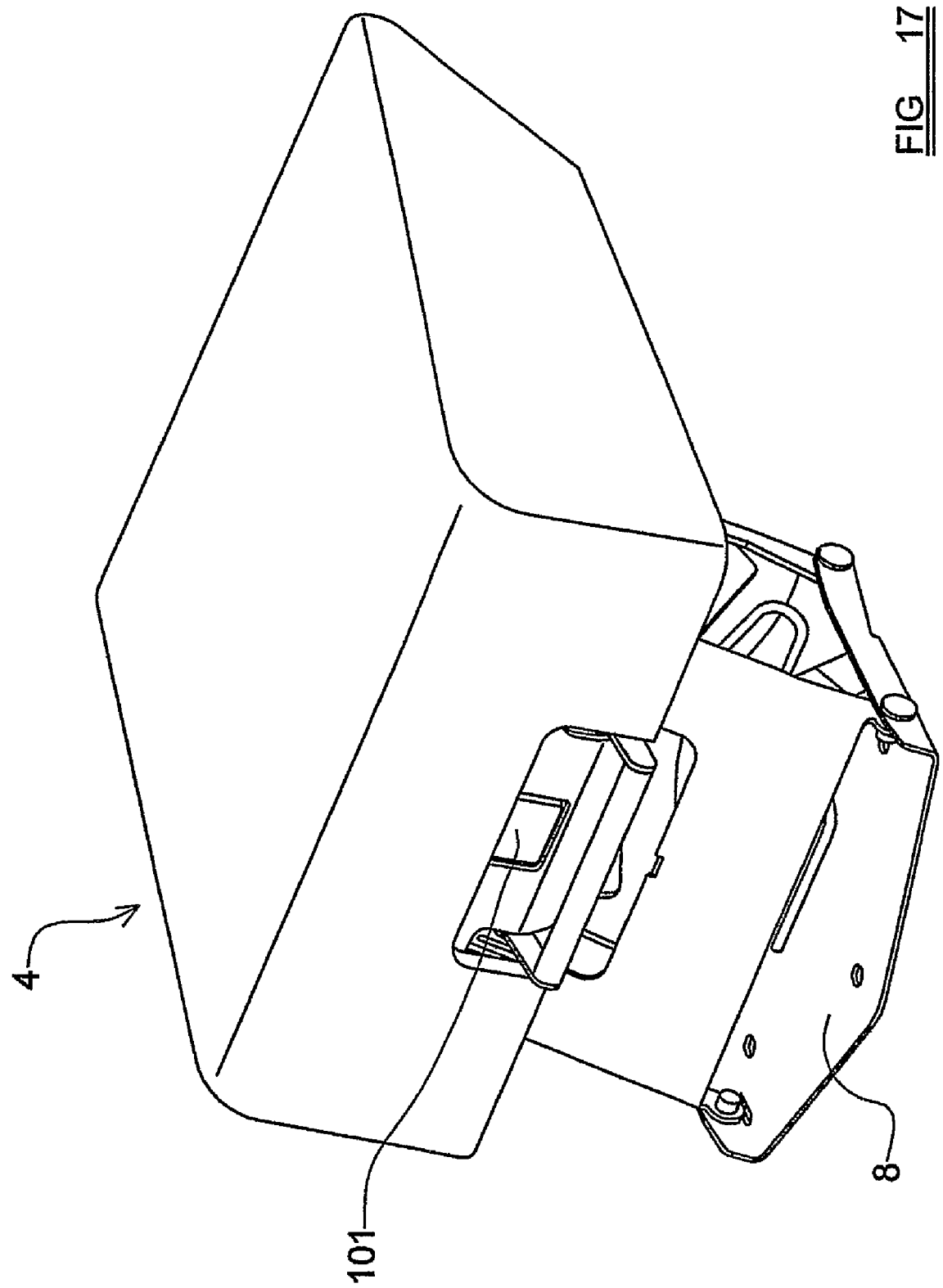
Figure 18:
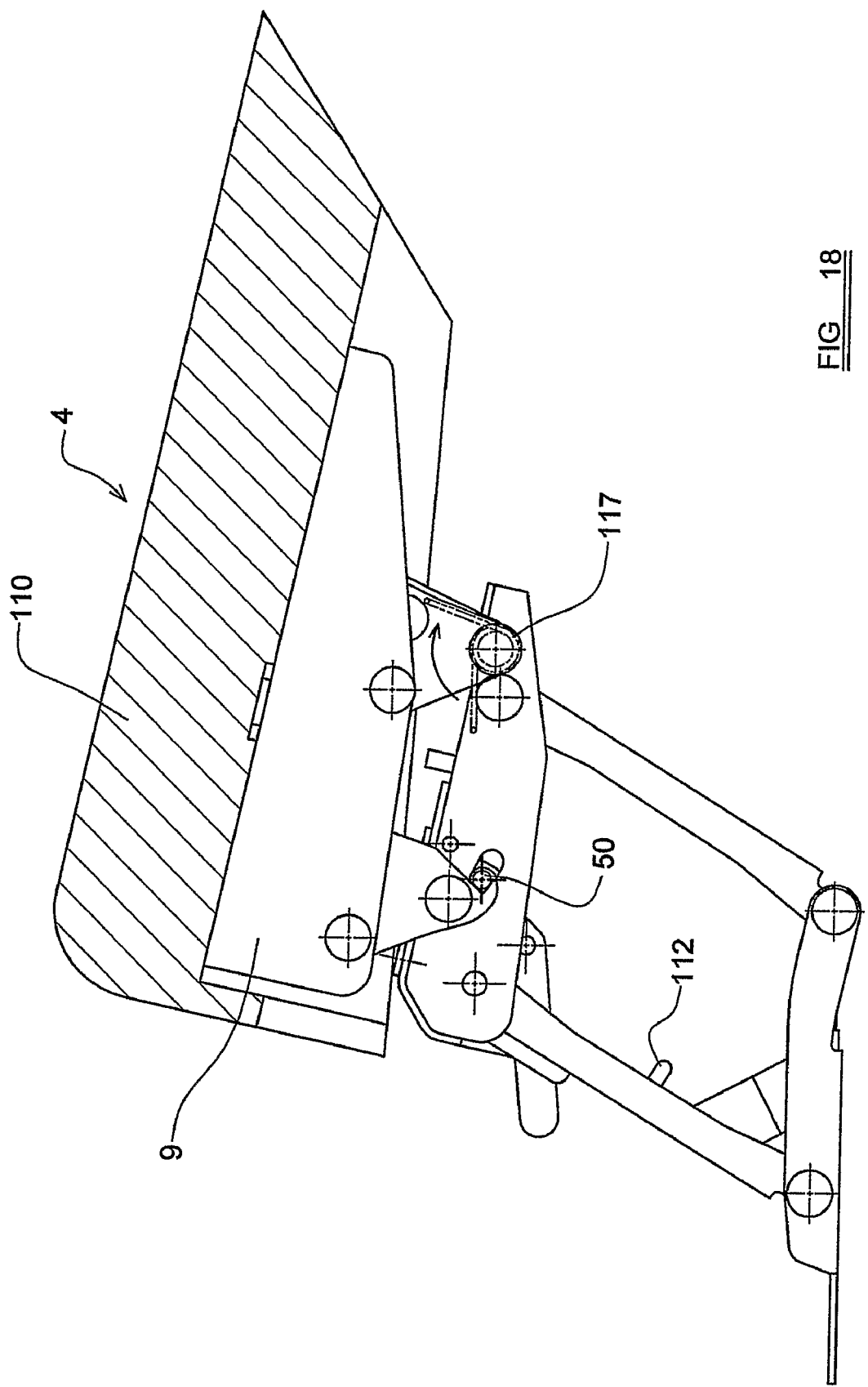

In order that the invention may be more readily understood, and so that further features thereof may be appreciated, the invention will now be described, by way of example, with reference to the accompanying drawings in which:

FIG. 1 is a perspective view illustrating a vehicle seat which incorporates an adjustable seat in accordance with the invention, showing the floor pan of the vehicle and showing the seat in a first condition, FIG. 2 is a sectional view of the seat of FIG. 1, FIG. 3 is a view corresponding to FIG. 1 showing the adjustable seat in an intermediate position, FIG. 4 is a sectional view of the seat in the position shown in FIG. 3, FIG. 5 is a view corresponding to FIGS. 1 and 3 illustrating the seat in a final position, FIG. 6 is a sectional view through the seat in the final position of FIG. 5, FIG. 7 is an exploded view illustrating the major components of the mounting arrangement of the moveable squab element, FIG. 8 is an enlarged view of a catch, FIG. 9 is an enlarged view of an intermediate element and a seat support, FIG. 10 is a perspective view of the mounting arrangement of a moveable squab element when in the fully extended position, FIG. 11 illustrates the moveable squab element in an initial position, FIG. 12 is a sectional view through the moveable squab element in the initial position, FIG. 13 is a sectional view corresponding to FIG. 12 illustrating operation of a first actuating handle, FIG. 14 is a sectional view corresponding to FIG. 13 illustrating components of the seat in the intermediate position, FIG. 15 is a further sectional view illustrating components of a seat in the intermediate position, FIG. 16 is yet a further sectional view illustrating components of the seat in the intermediate position, FIG. 17 is a perspective view illustrating components of the seat in the intermediate position, FIG. 18 is a sectional view illustrating components of the seat in the final position, FIG. 19 is a view illustrating components of a locking arrangement when in a fully locked position, FIG. 20 illustrates components of the locking arrangement of FIG. 19 when one part of the locking arrangement is released, and FIG. 21 is a further view illustrating the locking arrangements of FIGS. 19 and 20 in a fully released condition.

FIG. 1 illustrates an adjustable seat 1 in accordance with the invention mounted in a motor vehicle. The seat 1 incorporates a back-rest 2 and a first squab element 3 which is fixed in position. A second squab element 4 is provided, the second squab element 4 being moveable with respect to the fixed squab element 3. In an initial position of the moveable squab element 4, as shown in FIG. 1, the moveable squab element 4 is located in front of and substantially in alignment with the fixed squab element 3.

As can be seen more clearly from FIG. 2 the moveable squab element 4 is connected, by means of a mounting arrangement 5, to an underlying floor pan 6 of the vehicle.

As will become clear from the following description, the moveable squab element 4 may be moved to two distinct positions, the first position being an intermediate position spaced above the fixed squab element 3, and the second position being a higher position above the second squab element 3.

As can be seen in FIG. 3, when the moveable squab element 4 is in the intermediate position it has moved upwardly and rearwardly relative to the first fixed squab element 3, so as to be located immediately above the fixed squab element 3 with the rear edge of the moveable squab element 4 adjacent the backrest 2 of the seat 1. As shown in FIG. 4, this movement has been effected by means of a first linkage 7. The linkage 7 has its lower end connected to a floor mount 8 secured to the floor pan 6. The mounting arrangement 5 includes a seat mount 9 which is embedded in the moveable squab element 4.

As can be seen from FIGS. 5 and 6, when the moveable squab element 4 has been moved to its final or upper-most position, the moveable squab element 4 is still located above the fixed squab element 3 with its rear edge adjacent the backrest of the seat, but at a greater height above the fixed squab element 3 than when in the intermediate position of FIGS. 3 and 4. As can be seen from FIG. 6, the seat mount 9 is actually connected to the upper part of the first linkage 7 by a second or intermediate linkage 10.

Thus the moveable squab element 4 is connected to the floor pan 6 of the vehicle by means of a first linkage 7 in conjunction with a second or intermediate linkage 10, operation of the first linkage 7 permitting the moveable squab element 4 to move from the initial position, in which the seat is configured for occupation by an adult, to an intermediate position, in which the seat is configured for occupation by a relatively old child, such as a child between 6 and 10 years old. By subsequent actuation of the intermediate linkage 10 the moveable squab element 4 may be moved to a higher final position in which the seat is configured for occupation by a relatively young child, such as a child approximately 3 to 6 years old.

The first and second linkage may each be locked in the extended or in the retracted position.

FIG. 7 is an exploded view of the principal components of the first linkage and the intermediate linkage.

The floor mount 8 is in the form of a substantially planar plate 11 provided with fixing holes 12 to receive screws or the like to secure the plate 11 to the floor pan 6 of the vehicle. At each side of the plate 11 there is an upstanding side-wall 13,14, the side-walls extending rearwardly beyond the rear-most edge of the plate 11 to form rearwardly extending fingers 15, 16. At the front part of each side-wall 13,14 and at the rear part of each finger 15,16 there is provided a mounting aperture 17 for monitoring a part of the first linkage 7. Provided at the rear edge of the plate 11 adjacent each of the side-walls 13,14 is an upwardly and rearwardly inclined stop element 18.

The first linkage 7 is formed from two link elements 19, 20. The link element 19 comprises a central plate 21 provided with two depending side-walls 22,23, at opposed side edges of the plate, which each extend beyond the end of the plate 21. The terminal part of each side-wall is provided with a mounting aperture 24. The upper-most edge of the plate 21 is provided with a centrally located large rectangular recess or cut-out 25. On each side of the cut-out 25, an engagement element 26 is provided, each engagement element extending to a position beyond the edge of the plate 21. Each engagement element 26 is planar, and lies in a plane parallel to that of the depending side-walls 22,23. The engagement elements 26 project beyond the edge of the plate 21, and each engagement element 26 is provided with an enlarged rounded head 27 having a central aperture 28 and a rectangular recess 29 in the periphery of the head, the recess 29 corresponding to the recess provided in a spanner.

The underside of the plate 21 is provided with two downwardly and rearwardly extending stop elements 30 located adjacent the side-walls 22, 23, so as to be in co-alignment with the stop elements 18 provided on the plate 11 of the floor mount 8. As will become clear, the stop elements 18 and 30 engage to limit movement of the first linkage when the moveable squab element 4 is moved to the intermediate position.

The second link element 20 of the first linkage 7 has a central region 30 in the form of a plate provided with two relatively large apertures 31,32 therein, the apertures being symmetrically disposed about a longitudinal axis of the plate. The plate 30 carries, at its opposed side edges, two upwardly directed side arms 33,34, each of these side arms extending beyond the end edges of the plate to provide protruding terminal portions of the side arms 33,34. Each terminal portion is provided with a mounting aperture 35.

Here it is to be understood that the lower ends of the side-walls 22, 23 of the first link element 19 and the side arms 33, 34 of the second link elements 20 are to be pivotally connected to the floor mount 8. Thus the apertures 24 provided at the lower-most ends of the side-walls 22, 23 of the first link element 19 are co-aligned with the apertures 17 formed in the upstanding side arms 13, 14 of the floor mount 8 and are interconnected by appropriate pivot pins, and the apertures 35 formed at the lower-most ends of the side arms 33, 34 of the second link element 21 are co-aligned with the apertures 17 formed in the rearwardly directed fingers 15, 16 of the floor mount 8 and are connected by appropriate pivots. The two link elements 19, are thus pivotally connected to the floor mount 8.

A biasing spring 36 is provided to engage the plate 11 of the floor mount 8 and the central plate 30 of the second link element 21 to bias the first linkage 7 upwardly.

The upper ends of the first linkage 7 are connected to an intermediate support 37.

The intermediate support 37 comprises an upper substantially planar plate 38 (part of which is cut-away in FIG. 7 for the sake of clarity of illustration), having two depending side plates 39, 40. The forward-most edge of the upper plate 38 is lipped 39 to extend downwardly, and in the central region of the lip 39 a portion of the plate 38 continues to extend downwardly to form the front cover 40 for a latch housing 41. The latch housing 41 is mounted beneath the forward-most central part of the plate 38 and defines a camber which receives a latch. The front cover 40 is provided with a centrally located aperture 42 providing access to the interior of the latch housing 41.

Each side plate 39, 40 of the intermediate support 37 is provided with a plurality of apertures. The apertures in each side plate 39, 40 are of the same size and shape and in the same locations. A first aperture 43, located towards the front, is provided to form a pivotal connection with the aperture 24 formed at the upper-most end of a side-wall 22, 23 of the first link element 19. A second aperture 44, located towards the rear, is to be aligned with and to be pivotally connected to an aperture 35 formed at the upper-most end of a side arm 33, 34 of the second link element 20.

A third aperture 45, located generally towards the front and a fourth aperture 46 located towards the rear of each side plate 39, 40 are to form pivotal connections with the second or intermediate linkage 10 which will be described in more detail below. A further aperture 47 and an inclined elongate slot 48 located adjacent the aperture 47 are provided to receive a latch member 49.

The latch member 49 is in the form of an elongate rod 50, having projecting end portions 51, 52 of reduced diameter which are to be accommodated within the elongate slots 48. Spaced slightly inwardly from the ends of the rod are two projecting plates 53, 54 which lie in a plane orthogonal to the axis of the rod 50 and which extend radially. Each plate 53, 54 carries an outwardly projecting pivot 55, 56. The pivots 55, 56 are parallel to the rod 50. The pivots 55, 56 are to be accommodated within the apertures 47 and the projecting portions 51, 52 are to be accommodated within the inclined slots 48 of the side plates 39, 40. It is to be appreciated, therefore, that if the latch member 49 executes a pivotal movement about the axis defined by the pivots 55, 56 as accommodated within the apertures 47, the projecting portions 51, 52 will move along the inclined slots 48.

A biasing spring 57 is provided to bias a latch member 49 to a position in which the projecting portions 51, 52 are at the forward or upper-most end of the inclined slot 48.

The second or intermediate linkage 10 consists of two primary link elements, in the form of a forward link element 59 and a rear link element 60. The forward link element 59 consists of a transversely extending rectangular plate 61 carrying, at either end, a depending linkage lug 62, 63 of substantially triangular form. Each lug is provided with three apertures. The first apertures 64, located adjacent the lower-most corner of the depending lugs, are to be pivotally connected to the forward-most apertures 45 of the side plates 39, 40 of the intermediate support 37. One of the two upper apertures 65 of each lug 62, 63 is to be connected to the seat support 9 which will be described in greater detail below and the third aperture 66 of each lug 62, 63 is to be connected to a compensating link that will be described below.

It is to be observed that the lower-most corner of each of the depending lugs 62, 63 is provided with a hook-shaped recess 67 for a purpose that will become clear below.

The second link element 60 consists of a transversely extending plate 68, the plate carrying, at opposed ends, two depending parallel triangular lugs 69, 70. The triangular lugs 69, 70 are each provided with three apertures. A first aperture 71, located adjacent a depending corner of the lug, is to be aligned with and pivotally connected to the rear-most aperture 46 provided on the side plates 39, 40 of the intermediate support element 37. The forward-most of the upper two apertures 72 is to be connected to the seat support 9 as will be described below and the rear-most aperture 73 is to be connected to a said compensating link.

Two elongate compensating links 74, 75 are provided, each link having an aperture 76 at each end thereof. The apertures 76 at the forward end of each link are to be pivotally connected to the apertures 66 in the lugs provided in the forward-most link element 59, whereas the apertures 76 at the rear-most end of each link are to be pivotally connected to the apertures 73 in the lugs of the rear-most link element 60.

The seat mount 9 comprises a horizontal plate 80 with two depending side-walls 81, 82. The side-walls are provided with apertures 83 at their forward ends and apertures 84 at their rearward ends. The forward-most apertures 83 are to be pivotally connected to the forward-most apertures 65 of the lugs 62, 63 of the forward-most linkage element 59 and the apertures 84 are to be connected to the aperture 72 of the lugs 69, 70 of the rear-most linkage element 60.

A square aperture 85 is formed in a central part of the plate 80 and an elongate retaining plate 86 has one end thereof secured to the plate 80 adjacent the aperture 85, by welding or riveting, the retaining plate 86 having an apertured end which extends downwardly through the square aperture 85 to be engaged by a catch.

A locking hook is provided, the locking hook comprising a hook element 90 formed integrally with an actuating arm 91, the hook element 90 and the arm presenting a substantially inverted "U" configuration, there being a pivot trunnion 92 provided at the junction between the hook element 90 and the actuating arm 91. The lower-most surface of the hook element is chamfered. The hook element 90 is biased to a locking position, either by a spring (not shown) or by locating the centre of gravity of the hook element at an appropriate point relative to the trunnion 92.

A catch 93 is provided, to be accommodated within the catch housing 41. The catch 93 can be seen clearly in FIG. 8. The catch comprises a pivotally mounted catch arm 94. The catch arm 94 lies in a horizontal plane, and is of generally "L"-shape having two horizontally extending arms, one arm 95 being longer than the other arm 96. A vertical pivot 97 passes through the junction between the two arms. At the free end of the shorter arm 96 there is an upstanding finger 98, the finger 98 carrying a laterally extending detent 99, the detent 99 thus extending in a direction substantially parallel with the direction of the longer arm 95, but being located at a point in space above the plane of the longer arm 95 and the relatively short arm 96. The upper surface of the detent 99 is chamfered.

The free end of the relatively long arm is provided with a biasing spring 100. A push-button 101 is provided connected to the longer arm 95 such that actuation of the push-button 101 will cause the longer arm to move against the bias of the spring 100 about the pivot axis 97, thus moving the shorter arm 93 and the upstanding finger 98 and the detent 99 to retract the detent 99.

The catch 93 is to be mounted in the catch housing 41 with the push button 101 aligned with the aperture 42. When the seat mount 9 is immediately above the intermediate support 37 the detent 99 engages and retains the apertured end of the retaining plate 86 (see FIG. 9).

An actuating handle 102 is provided, the handle comprising a cylindrical hand grip 103, the ends of the hand grip 103 being connected to forwardly extending parallel side plates 104, 105. The side plates 104, 105 are each provided with a pivot aperture 106, 107 and a transverse engagement rod 108 extends between the side plates 104, 105 and projects slightly beyond the side plates 104, 105. The width between the side plates is slightly greater than the width of the catch housing 41, and the handle is pivotally connected to the catch housing with the hand grip 103 being located in front of the catch housing. The handle is biased to a position in which the hand grip 103 in its lowermost position. This may be achieved with a spring (not shown) or by weighting the hard-grip 103.

FIG. 10 illustrates the components shown in exploded view in FIG. 7, when assembled and when in a fully extended position, for sake of clarity of illustration.

It can be seen that the floor mount 8 is located at the lowermost part of the assembly illustrated in FIG. 10. The two link elements 19, 20 of the first linkage extend upwardly and rearwardly as parallel links, and are biased to this position by the biasing spring 36. The uppermost ends of the link elements 19, 20 of the first linkage hold the intermediate support 37 in a substantially horizontal position. The intermediate linkage 10 shown in the extended position, with the seat mount 9 thus being spaced above the intermediate support 37.

FIG. 11 illustrates the moveable squab element 4 when the squab is in an initial or fully retracted position. This is the first position of the adjustable seat, as shown in FIGS. 1 and 2. Both the first linkage 7 and the second or intermediate linkage 10 are in a fully retracted position.

The outermost part of the moveable squab is provided with padding and upholstery 100. The hand grip 103 of the handle 102, and also the push button 101 of the catch 93 are accessible through a "cut out" 111 provided in the padding and upholstery 100. It is thus to be appreciated that when the moveable squab element 4 is in the initial position, the actuating handle and the actuating button are readily accessible but are not obtrusive.

FIG. 12 illustrates the components of the moveable squab element when in the condition illustrated in FIG. 11. It is to be observed that the locking hook 90 is pivotally mounted, by means of the trunnion 92 to a depending lug 111 which is supported on the intermediate support 37.

The hook element 91 of the locking hook engages a "U"-shaped staple 112 which extends upwardly from the central part of the plate 21 of the first link element 19. The hook engages the staple 12, thus preventing the seat mount 9 from moving upwardly, helping to retain the components of the two linkages in the initial position shown in FIG. 12.

A blocking element 113 is provided which is mounted on a shaft 114. The shaft 114 has opposed ends thereof received within the apertures 28 of the engagement head 26 which are provided on opposite sides of the cut out 25 provided in the plate 21 of the first link element 19. The shaft 114 extends across the interior of the catch housing 41. The shaft 114 is aligned with the axes of the pivots which pivotally connect the apertures 24 at the upper ends of the side-walls 22, 23 of the first link element 19 of the first linkage 7 and the apertures 43 of the side plates 39, 40 of the intermediate support 37. The stop element 113 has a projecting part which, in the initial position of the components illustrated, is located immediately behind the press button 101, thus prevent actuation of the press button. As can be seen in FIG. 5 the foremost end of the side plate 105 of the actuating handle 102 lies in contact with the elongate rod 50 of the latch member 49. The elongate rod 50 is mounted for movement, that movement being guided by the projecting end parts of the elongate rod 50 which are accommodated within elongate inclined slots 48 present in the side plates 39,40 of the intermediate support 37. The central part of the rod 50 is provided with a projection 115 which in an initial position of the components, as illustrated, lies adjacent the actuating arm 92 of the locking hook 91.

The handle 102 is mounted in position by means of a shaft 116 which extends through the apertures 106,107 provided in the side plates 104,15 of the handle. The engagement rod 108 is located in position where it engages part of the blocking element 113 to retain the blocking element 113 in its initial position. Thus the components of the adjustable seat are retained in their initial position, and the seat may be used by an adult.

If the hand grip 103 of the handle 102 is grasped and moved upwardly the handle will pivot about the axis of the shaft 116. The side plates 104,105 of the handle execute a rotational movement, and the side plates engage the rod 50 of the latch member 49, thus moving the rod 50 with a rearward and downward movement as the projecting end portions 51, 52 of the rod 50 are guided along the elongate slots 48. The projection 115 provided at the central part of the rod 50 engages the actuating arm 92 of the retaining hook 91, and the retaining hook pivots about the axis of the trunnion 93, thus causing the hook element 91 to become disengaged from the staple 112. At the same time the engagement rod 108 moves away from the blocking element 113.

The handle 102 has thus performed the function of a first actuator to release the locking mechanism initially retaining the first linkage 7 in the retracted position. The spring 36, which is initially in a strongly compressed state, may now expand, and the first and second link elements 19, 20 of the first linkage 7 execute a parallel motion, continuing to move upwardly and rearwardly until the stop element 30 carried by the first link element 19 engage the stop elements 18 carried by the floor mount 8 (see FIG. 15). The stop elements may, if desired, be formed at least partly of a slightly yieldable material, such a relatively hard rubber material.

The pivotal movement of the first link element 19 causes the blocking element 113 to rotate within the catch housing 41 and, as can be seen from FIG. 14, the blocking element 113 is moved to a position which the press button 101 of the catch 93 may actually be pressed inwardly to release the catch 9. The moveable squab element is now in the second or intermediate position as initially illustrated in FIGS. 3 and 4. The first linkage 7 is now in a fully extended position.

As can be understood from considering FIG. 15, as the components of the linkage 7 have moved from the initial position to the intermediate position, the curved outer surface of the rounded head 27 of each engagement element 26 has pressed against the engagement rod 108 of the handle 103, until the engagement rod 108 becomes co-aligned with the rectangular recesses 29, when the locking pin is urged into the recesses 29 due to the biasing of the handle to a position in which the hand grip 103 is in its lowermost position. Thus the moveable squab element 4 is locked in the intermediate position, and cannot move further up and cannot move further down. This is the position shown in FIG. 15.

When the moveable squab element is in the intermediate position the lug 63 of the forward link element 59 of the intermediate linkage 10 has an edge portion thereof engaging the elongate rod 50 of the latch member 49, as can be seen in FIG. 16.

The components of the adjustable seat now have the condition illustrated in FIG. 17 and it is to be appreciated that the press button 101 may now be actuated. The press button 101 is an actuator to release the locking mechanism that locks the second or intermediate linkage 10 in the retracted position. If the button 101 is depressed, the catch 93 will be released, with the detent 99 being removed from the apertured part of the retaining plate 86. Thus the seat mount 9 is released, and, due to an upward bias provided by a torsion spring 117, the forward link element 59 and the rear link element 60 of the second or intermediate linkage 10 execute a simultaneous substantially identical rotation, due to the effect of the compensating links 74,75. The linkage is thus a linkage that effects parallel rotation, as the rotational motion of the forward link element 59 and the rear link element 60 are identical. The seat mount 9, carrying the padding and upholstery 110, thus moves upward to the final position, in which the second or intermediate linkage 10 is in a fully extended position. As the moveable squab element 4 moves to this final position, so a curved part of each of the triangular lugs 69, 70 engage the transverse rod 50 of the retaining element 49, (see FIG. 16) causing the rod 50 to move with a downward and rearward movement against the bias imparted to the rod 50, with that movement being guided by the projecting portions 51, 52 in engagement with the inclined slots 48.

However, as will be understood from FIG. 18, when the moveable squab element 4 reaches the final position, the elongate rod 50 is biased, by the spring 57 into the hook shaped recess 67 provided in each of the lugs 62, 63 of the forward link element 59. This engagement serves to retain the moveable squab element 4 in its final or uppermost position, as shown in FIG. 18.

Thus, with the seat in this condition, as shown in FIG. 19 the intermediate support 37 is locked in its position by virtue of the engagement of the engagement rod 108 of the handle 102 with the recesses 29 provided on the engagement elements 26 which are fast with the first link element 19 of the first linkage. Additionally the seat support 9, and the associated upholstery 110, is retained in position by the engagement of the rod 50 of the latch member 49 with the hook shaped recesses 67 provided on the lugs 62,63 of the forward link element 59 of the intermediate linkage 10.

If the handle 102 is pulled up slightly, as shown in FIG. 20, the rearmost part of the side plate 105 engages the rod 50 of the engagement element 49 and moves it slightly against the spring bias, thus moving the rod 50 to such a position that the rod 50 is disengaged from the hook shaped recess 67 provided in the lugs 62, 63 of the forward link element 59 of the intermediate linkage 10. With the rod 50 disengaged from the hook shaped recess 67 the moveable squab element may be pressed downwardly, against the upward bias imparted to it by the torsion spring 117, thus returning the moveable squab element 4 to the intermediate position. As the apertured end of the elongate retaining plate 86 engages the upper surface of the detent 99 of the catch 93, the detent 99 is moved due to its chamfered upper surface, against the bias of the spring 100, until the detent 99 is aligned with the aperture, when the detent 99 moves under the spring bias to re-engage the apertured retaining plate 86.

It is to be noted, however that by moving the handle 102 only slightly, the engagement rod 108 carried by the handle is moved within the recess 29 formed in the engagement head which is fast with the first link element 19, but is not disengaged from that recess. Thus it is only the seat support 9 which can be moved downwardly.

However, if the handle 102 is pulled up to a greater extent than shown in FIG. 20, for example to the extent shown in FIG. 21, the effect of the substantial movement of the handle is not only to disengage the rod 50 of the engagement element 49 from the hook shaped recess 67 provided in the lug 62, 63, but also to totally disengage the engagement rod 108 carried by the handle 102 from the recesses 29 formed in the engagement heads 26. Thus, a downward force applied to the moveable squab element when the handle is fully lifted, as shown in FIG. 21, will cause both the seat support 9 and the intermediate support 37 to move downwardly, thus returning the squab to the initial position.

As the moveable squab element 4 returns to the initial position, the chamfered lower surface of the hook element 19 engages the staple 112, displacing the hook element until the moveable squab element 4 is in the initial position when the hook element, under its bias, re-engages the staple 112.

Of course, it is to be understood that if the squab is in the intermediate position, lifting the handle 102 by a substantial extent, such as shown in FIG. 21, will serve to disengage the engagement rod 108 carried by the handle from the recess 29 provided in the engagement head 26 enabling a downward force to be applied to the moveable squab element 4 to return the moveable squab element to the initial position.

When used in this Specification and Claims, the terms "comprises" and "comprising" and variations thereof mean that the specified features, steps or integers are included. The terms are not to be interpreted to exclude the presence of other features, steps or components.

The invention claimed is:

1. An adjustable vehicle seat comprising:
a moveable squab element mounted to an underlying mount by a first linkage carrying an intermediate support, the first linkage moveable from a retracted position to an extended position and operable to affect vertical adjustment of the intermediate support relative to the mount;
a second linkage between the intermediate support and the moveable squab element, the second linkage interconnecting the moveable squab to the intermediate support, moveable from a retracted position to an extended position and operable to affect vertical adjustment of the moveable squab relative to the intermediate support;
a first locking mechanism to lock the first linkage in its extended position;
a second locking mechanism to lock the second linkage in its extended position;
a first actuator for releasing the first locking mechanism; and
a second actuator for releasing the second locking mechanism;
wherein the second actuator is a push button and a blocking element is provided to block actuation of the push button, the blocking element being mounted to move in response to movement of the first linkage, to be positioned to block movement of the push button when the first linkage is in the retracted position and to permit movement of the push button when the first linkage is in the extended position.

2. The adjustable vehicle seat according to claim 1, wherein the first linkage is a parallel arm linkage.

3. The adjustable vehicle seat according to claim 1, wherein the second linkage is a linkage that affects parallel motion.

4. The adjustable vehicle seat according to claim 1, wherein each linkage is associated with a biasing element, the biasing element serving to bias the linkage to the extended position.

5. The adjustable vehicle seat according to claim 1, wherein the push button is associated with a catch member, the catch member carrying a detent which engages an apertured retaining plate secured to the moveable squab element to retain the moveable squab element in a predetermined position relative to the intermediate support, the push button being actuable to move the catch to release the detent from the apertured retaining plate to permit the moveable squab element to move upwardly.

6. The adjustable vehicle seat according to claim 1, wherein the first actuator is a handle, and the handle is associated with the first locking mechanism locking the handle and the first and second locking mechanisms cooperating such that on partial movement of the handle the second locking mechanism is released, and on a further movement of the handle the first locking mechanism is released.

7. The adjustable vehicle seat according to claim 6, wherein the first locking mechanism incorporates a latch member which is resiliently biased to engage a recess on an element carried by a link of the second linkage to retain that element in a predetermined position, and the second locking arrangement includes an engagement rod received within a recess on an engagement head carried by a link of the first linkage, the handle carrying the engagement rod and the handle having a surface engaging the latch member so that movement of the handle moves the latch member and the engagement rod out of their respective recesses.

8. The adjustable vehicle seat according to claim 1, in combination with a seat in a vehicle.

9. The adjustable vehicle seat according to claim 1, wherein the first and second locking mechanisms operate independently from one another and the adjustable vehicle seat is operable in an intermediate position in which the first locking mechanism is locked in the extended position and the second locking mechanism is in the retracted position and further operative in a final position in which the first and second linkages are both locked in their extended positions.

10. The adjustable vehicle seat according to claim 1, wherein the adjustable seat is operative in an initial position in which the first and second linkages are in their retracted positions, operative in an intermediate position in which the first linkage is in its extended position and the second linkage is locked in its retracted position, and operative in a final position in which the first and second linkages are both locked in their extended positions.

11. An adjustable vehicle seat comprising:
a moveable squab element mounted to an underlying mount by a first linkage carrying an intermediate support, the first linkage operable to affect vertical adjustment of the intermediate support relative to the mount;
a second linkage between the intermediate support and the moveable squab element, the second linkage being a linkage that effects parallel motion and operable to affect a vertical adjustment of the moveable squab relative to the intermediate support;
a biasing element associated with each linkage, the biasing element serving to bias each associated linkage to the extended position;
each linkage being moveable from a retracted position to an extended position, each linkage being associated with at least one locking mechanism to lock the linkage in the extended position and lock the linkage in the retracted position;
a first actuator for releasing the locking mechanism associated with the first linkage which retains the first linkage in the retracted position; and
a second actuator in the form of a push button being provided for releasing the locking mechanism associated with the second linkage; and
a blocking element provided to block actuation of the push button, the blocking element being mounted to move in response to movement of the first linkage, to be positioned to block movement of the push button when the first linkage is in the retracted position and to permit movement of the push button when the first linkage is in the extended position.

12. The adjustable vehicle seat according to claim 11, in combination with a seat in a vehicle.

13. An adjustable vehicle seat comprising:
a lower seat portion;
a squab element moveable relative to the lower seat portion and operable in a first orientation to cooperate with the lower seat portion to define a seating area, the squab element positioned forwardly of the lower seat portion in the first orientation;
an intermediate support;
a first linkage moveably interconnecting an underlying mount and the intermediate support, the first linkage operable to affect vertical movement of the intermediate support relative to the underlying mount between a retracted position and an extended position;
a second linkage moveably interconnecting the intermediate support and the squab element, the second linkage operable to affect vertical movement of the squab element relative to the intermediate support between a retracted position and an extended position; and
a squab locking mechanism for locking the squab element relative to the intermediate support in the extended position.

14. The adjustable vehicle seat according to claim 13, wherein the first linkage is a parallel arm linkage.

15. The adjustable vehicle seat according to claim 13, wherein the second linkage is a linkage that affects parallel motion.

16. The adjustable vehicle seat according to claim 13, in combination with a seat in a vehicle.

17. The adjustable vehicle seat according to claim 13, wherein the first linkage and the second linkage are independently operated.

18. The adjustable vehicle seat according to claim 13, further comprising an intermediate support locking mechanism for locking the intermediate support relative to the underlying mount in an intermediate support extended position.

19. The adjustable vehicle seat according to claim 18, wherein the squab locking mechanism and the intermediate support locking mechanism operate independently from one another such that the adjustable vehicle seat is operative in an intermediate position in which the intermediate support is locked in its extended position and the squab element is in its retracted position and further operative in a final position in which the intermediate support and the squab element are both locked in their extended positions.

20. The adjustable vehicle seat according to claim 19, wherein the adjustable vehicle seat is further operative in an initial position in which both the intermediate support and the squab element are in retracted positions and further wherein the squab element is locked in its retracted position when the adjustable vehicle seat is in its intermediate position.

21. The adjustable vehicle seat according to claim 13, wherein the first and second linkages are articulated to their retracted positions when the squab element is in the first orientation.

22. The adjustable vehicle seat according to claim 13, wherein the squab element is vertically movable relative to the lower seat portion from the first orientation to a second orientation when one of the first and second linkages is in its extended position and the other of the first and second linkages is in its retracted position.

23. The adjustable vehicle seat according to claim 22, wherein the squab element is vertically movable relative to the lower seat portion from the second orientation to a third orientation when both of the first and second linkages are in their extended positions.

24. An adjustable vehicle seat comprising:

a moveable squab element mounted to an underlying mount by a first linkage carrying an intermediate support, the first linkage operable to affect vertical adjustment of the intermediate support relative to the mount;

a second linkage between the intermediate support and the moveable squab element, the second linkage interconnecting the moveable squab to the intermediate support and operable to affect vertical adjustment of the moveable squab relative to the intermediate support;

each linkage of the first and second linkages moveable from a retracted position to an extended position, a first locking mechanism to lock the first linkage in its extended position; and a second locking mechanism to lock the second linkage in its extended position;

wherein the first actuator also serves as an actuator to release the locking mechanisms which locks the first and second linkages in the extended position;

wherein the first actuator is a handle, and the handle is associated with a first locking mechanism locking the first linkage in the extended position, and a second locking mechanism locking the second linkage in the extended position, the configuration of the handle and the locking mechanisms being such that on partial movement of the handle the second locking mechanism is released, and on a further movement of the handle the first locking mechanism is released.

* * * * *